United States Patent
Harrison et al.

(10) Patent No.: US 11,898,571 B2
(45) Date of Patent: Feb. 13, 2024

(54) COMPRESSOR LUBRICATION SUPPLY SYSTEM AND COMPRESSOR THEREOF

(71) Applicant: TRANE INTERNATIONAL INC., Davidson, NC (US)

(72) Inventors: Mark W. Harrison, Onalaska, WI (US); Steven J. Pitts, La Crescent, WI (US); Todd W. Smith, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 71 days.

(21) Appl. No.: 17/646,628

(22) Filed: Dec. 30, 2021

(65) Prior Publication Data

US 2023/0213040 A1 Jul. 6, 2023

(51) Int. Cl.
*F04D 29/063* (2006.01)
*F16N 39/02* (2006.01)
*F16N 3/04* (2006.01)
*F25B 31/00* (2006.01)
*F16N 39/04* (2006.01)

(52) U.S. Cl.
CPC .......... *F04D 29/063* (2013.01); *F16N 39/02* (2013.01); *F16N 39/04* (2013.01); *F25B 31/004* (2013.01); *F25B 31/008* (2013.01)

(58) Field of Classification Search
CPC ........ F04D 29/063; F16N 39/02; F16N 39/04; F25B 31/004; F25B 31/008; F25B 31/002; F25B 2500/16
See application file for complete search history.

(56) References Cited

U.S. PATENT DOCUMENTS

| 2,042,394 | A | 5/1936 | Gay |
| 5,899,091 | A | 5/1999 | Fraser, Jr. et al. |
| 6,058,727 | A | 5/2000 | Fraser, Jr. et al. |
| 8,424,337 | B2 | 4/2013 | Scarcella et al. |

(Continued)

FOREIGN PATENT DOCUMENTS

| WO | WO-2021106989 A1 * | 11/2020 | ............ F04C 29/025 |
| WO | WO-2021106989 A1 * | 6/2021 | ............ F04C 29/025 |

OTHER PUBLICATIONS

Pdf is translation of foreign reference WO-2021106989-A1 (Year: 2021).*
Pdf is translation of foreign reference (Year: 2020).*

*Primary Examiner* — Henry T Crenshaw
*Assistant Examiner* — Kamran Tavakoldavani
(74) *Attorney, Agent, or Firm* — Hamre, Schumann, Mueller & Larson, P.C.

(57) ABSTRACT

A lubricant supply system is for a compressor that compresses a first working fluid in a heat transfer circuit. The lubricant supply system includes a lubricant tank, a lubricant pathway for supplying lubricant from the lubricant tank to one or more bearings of the compressor, and a lubricant refrigeration system with a lubricant heater and a lubricant cooler. The lubricant heater configured to heat the lubricant discharged from the one or more bearings and the lubricant cooler configured to cool the lubricant flowing through the lubricant pathway. A method of lubricating a compressor includes heating the lubricant, directing the lubricant from a lubricant tank through a lubricant pathway to one or more bearings of the compressor, and cooling the lubricant passing through the lubricant pathway.

20 Claims, 7 Drawing Sheets

(56) References Cited

U.S. PATENT DOCUMENTS

| | | |
|---|---|---|
| 9,115,917 B2 | 8/2015 | Hokazono et al. |
| 9,982,918 B2 | 5/2018 | Lee et al. |
| 10,197,316 B2 | 2/2019 | de Larminat et al. |
| 10,845,095 B2 | 11/2020 | Ikeda et al. |
| 10,941,967 B2 | 3/2021 | De Larminat et al. |
| 2019/0078811 A1 | 3/2019 | Miyoshi et al. |
| 2019/0271491 A1* | 9/2019 | Sishtla ................ F04D 29/4213 |

* cited by examiner

COMPRESSOR LUBRICATION SUPPLY SYSTEM AND COMPRESSOR THEREOF

FIELD

This disclosure relates to compressor lubrication. In particular, this disclosure relates to providing lubrication to a compressor.

BACKGROUND

Compressors including parts (e.g., driveshaft, scroll, rotor, screws, impeller, and the like) configured to move to compress a fluid. The compressor includes one or bearing(s) that include surfaces (e.g., a moving surface and a non-moving surface, or the like) that slide against each other to allow movement. A bearing can provide support while allowing a moving component to move relative to the housing of the compressor. Lubricant (e.g., oil or the like) can be supplied to the bearing(s) to prevent wear between the surfaces of the bearings.

BRIEF SUMMARY

In an embodiment, a lubricant supply system is for a compressor in a heat transfer circuit. The compressor is configured to compress a first working fluid including a refrigerant. The lubricant supply system includes a lubricant tank, a lubricant pathway, and a refrigeration system with a lubricant heater and a lubricant cooler. The lubricant tank is configured to contain lubricant discharged from one or more bearings of the compressor. The lubricant pathway is connected to the lubricant tank and is configured to supply the lubricant from the lubricant tank to the one or more bearings of the compressor. The lubricant refrigeration system has a second working fluid that includes a refrigerant. The lubricant heater is configured to heat the lubricant to increase a temperature of the lubricant in the lubricant tank. The lubricant cooler is configured to cool the lubricant flowing through the lubricant pathway with the second working fluid.

In an embodiment, the lubricant supplied from the lubricant pathway to the one or more bearings of the compressor is less than saturated with the refrigerant.

In an embodiment, the lubricant refrigeration system is fluidly separate from the heat transfer circuit of the compressor and the second working fluid is different from the first working fluid.

In an embodiment, the lubricant refrigeration system includes an auxiliary compressor configured to compress the second working fluid and an expander configured to expand the second working fluid.

In an embodiment, the lubricant refrigeration system includes one or more refrigeration circuits separate from the heat transfer circuit, the one or more refrigeration circuits including the second working fluid, the lubricant heater, the lubricant cooler, the auxiliary compressor, and the expander.

In an embodiment, the one or more refrigeration circuits include a first refrigeration circuit and second refrigeration circuit. The first refrigeration circuit includes the second working fluid, the expander, the auxiliary compressor, and the lubricant heater. The lubricant heater is a heat exchanger configured to heat the lubricant with the second working fluid. The second refrigeration circuit includes a third working fluid, a second auxiliary compressor, a second expander, and the lubricant cooler. The lubricant cooler is a heat exchanger configured to cool the lubricant flowing through the lubricant pathway with the third working fluid. The third working fluid includes a refrigerant and is different from the first working fluid and the second working fluid.

In an embodiment, the one or more refrigeration circuits include a first refrigeration circuit that includes the second working fluid, the auxiliary compressor, the expander, the lubricant heater, and the lubricant cooler. The lubricant heater is a heat exchanger configured to heat the lubricant with the second working fluid; and the lubricant cooler is a heat exchanger configured to cool the lubricant flowing through the lubricant pathway with the second working fluid.

In an embodiment, the lubricant refrigeration system is configured to heat the lubricant passing through the lubricant heater and to cool the lubricant passing through the lubricant cooler simultaneously.

In an embodiment, the lubricant is discharged from the one or more bearings of the compressor at a first temperature. The lubricant heater is configured to increase the temperature of the lubricant to at or above a predetermined minimum temperature that is higher than the first temperature. The lubricant cooler is configured to cool the lubricant to at or below a predetermined maximum temperature that is lower than the predetermined minimum temperature.

In an embodiment, the lubricant heater is disposed at the lubricant tank or between the compressor and the lubricant tank. The lubricant pathway extends from the lubricant tank and through the lubricant cooler.

In an embodiment, the lubricant heater is an electric heater.

In an embodiment, the lubricant supply system also includes a lubricant separator. The lubricant separator includes one or more inlets configured to receive a mixture of the lubricant and the refrigerant of the first working fluid discharged from the one or more bearings of the compressor. The lubricant separator also includes the lubricant heater which is configured to heat the lubricant within the lubricant separator. The lubricant separator also includes a first outlet configured to discharge the lubricant after being heated by the lubricant heater to the lubricant tank.

In an embodiment, the lubricant separator includes a housing and a flow director disposed within the housing. The housing includes the inlet, the first outlet, and a second outlet. The flow director blocks a direct path from the inlet to the second outlet. The mixture of the lubricant and the refrigerant of the first working fluid includes gaseous refrigerant, liquid lubricant, and gaseous refrigerant dissolved in the liquid lubricant. The flow director is configured to direct: the gaseous refrigerant to flow around the flow director to the first outlet, the liquid lubricant through the lubricant heater to first outlet, in which the lubricant heater heating the liquid lubricant and liberating the gaseous refrigerant dissolved in the liquid lubricant from the liquid lubricant, and the gaseous refrigerant is liberated from the liquid lubricant to the second outlet.

In an embodiment, the flow director has a tubular shape.

In an embodiment, a method is directed to lubricating a compressor in a heat transfer circuit. The compressor is configured to compress a first working fluid that includes a refrigerant. The method includes heating, with a lubricant heater of a lubricant refrigeration system, lubricant discharged from one or more bearings of the compressor to increase a temperature of the lubricant in a lubricant tank. The lubricant refrigeration system includes the lubricant heater, a lubricant cooler, and a second working fluid including a refrigerant. The method also includes directing the lubricant from the lubricant tank through a lubricant pathway to the one or more bearings of the compressor. The method also includes cooling, with the lubricant cooler of the lubricant refrigeration system, the lubricant passing through the lubricant pathway with the second working fluid.

In an embodiment, the lubricant refrigeration system is fluidly separate from the heat transfer circuit of the compressor, the second working fluid being different from the first working fluid.

In an embodiment, the directing of the lubricant from the lubricant tank through the lubricant pathway to the one or more bearings of the compressor includes passing the lubricant through the lubricant cooler. The cooling of the lubricant flowing through the lubricant pathway includes operating a first refrigerant circuit of the lubricant refrigeration system. The first refrigerant circuit includes the second working fluid, an auxiliary compressor, an expander, and the lubricant cooler. The operating of the first refrigerant circuit includes compressing the working fluid with the auxiliary compressor, expanding the working fluid with the expander, and directing the second working fluid expanded by the expander through the lubricant cooler separate from the lubricant. The second working fluid adsorbs heat from the lubricant passing through the lubricant cooler.

In an embodiment, the heating of the lubricant with the lubricant heater includes the operating of the first refrigerant circuit of the lubricant refrigeration system. The operating of the first refrigerant circuit includes directing the second working fluid compressed by the auxiliary compressor to flow through the lubricant heater and the lubricant adsorbing heat from the second working fluid flowing through the lubricant heater.

In an embodiment, the heating of the lubricant with the lubricant heater includes operating a second refrigerant circuit of the lubricant refrigeration system. The second refrigerant circuit is separate from the first refrigerant circuit and includes a second auxiliary compressor, the lubricant heater, a second expander, an evaporator, and a third working fluid that includes a refrigerant. The third working fluid is different from the second working fluid. The operating of the second refrigerant circuit includes compressing the third working fluid with the second auxiliary compressor, directing the third working fluid compressed by the second auxiliary compressor to flow through the lubricant heater in which the lubricant adsorbs heat from the third working fluid flowing through the lubricant heater, expanding the working fluid with the second expander, and heating the working fluid with the evaporator.

In an embodiment, the method also includes directing the lubricant from the one or more bearings back to the lubricant tank.

BRIEF DESCRIPTION OF THE DRAWINGS

Like numbers refer to like features.

DETAILED DESCRIPTION

A heating, ventilation, air conditioning, and refrigeration ("HVACR") system is generally configured to heat and/or cool an enclosed space (e.g., an interior space of a commercial or residential building, an interior space of a refrigerated transport unit, or the like). The HVACR system includes a heat transfer circuit that includes a compressor and a working fluid (e.g., a refrigerant, a refrigerant mixture, or the like) that circulates through the heat transfer circuit. The working fluid is utilized to heat or cool a process fluid (e.g., air, water and/or glycol, or the like).

The compressor includes components (e.g., driveshaft, scroll, rotor, screws, impeller, and the like) that move relative to the housing of the compressor to compress the working fluid. One or more bearing(s) are provided to support said components within the compressor. After being supplied to the bearing(s), the lubricant mixes with the working fluid. The lubricant is separated from the working fluid and separated lubricant is then circulated back to the bearing(s). The lubricant can be stored in a lubricant tank until its supplied back to the bearing(s). The working fluid includes refrigerant. New types of low global warming potential (GWP) refrigerants, such as R514A refrigerant, R1233zd(E) refrigerant, R1234ze(E) refrigerant, R515B refrigerant, R513A refrigerant, and the like, are more easily dissolved into the lubricant causing the lubricant to be less effective in providing lubrication to the bearing(s).

Embodiments described herein are directed to lubricant supply systems for compressors, compressors including such lubricant supply systems, and methods of supplying lubricant to compressors that supply lubricant having a suitable viscosity for providing lubrication and minimizing refrigerant dissolved in the supplied lubricant.

Figure 1:
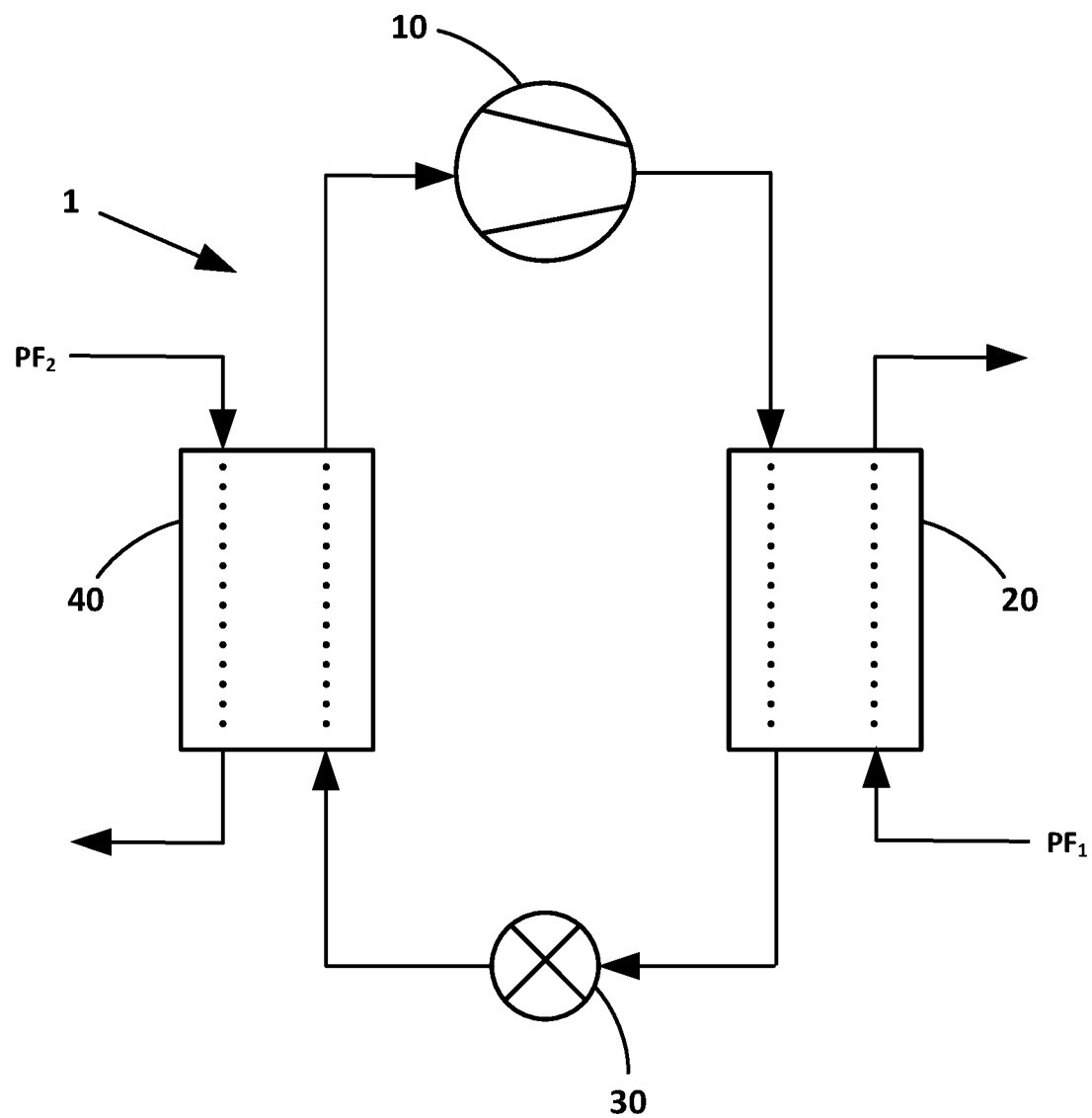
FIG. 1 is a schematic diagram of an embodiment of a heat transfer circuit of a heating, ventilation, air conditioning, and refrigeration system.

FIG. 1 is a schematic diagram of a heat transfer circuit 1 of a HVACR system, according to an embodiment. The heat transfer circuit 1 includes a compressor 10, a condenser 20, an expansion device 30, and an evaporator 40. In an embodiment, the heat transfer circuit 1 can be modified to include additional components. For example, the heat transfer circuit 1 in an embodiment can include an economizer heat exchanger, one or more flow control devices, a receiver tank, a dryer, a suction-liquid heat exchanger, or the like.

Dotted lines are provided in the Figures to indicate fluid flows through some components (e.g., compressor 10, condenser 20, evaporator 40) for clarity, and should be understood as not specifying a specific route within each component. The components of the heat transfer circuit 1 are fluidly connected. The heat transfer circuit 1 can be configured as a cooling system (e.g., a fluid chiller of an HVACR, an air conditioning system, or the like) that can be operated in a cooling mode, and/or the heat transfer circuit 1 can be configured to operate as a heat pump system that can run in a cooling mode and a heating mode.

The heat transfer circuit 1 applies known principles of gas compression and heat transfer. The heat transfer circuit can be configured to heat or cool a process fluid (e.g., water, air, or the like). In an embodiment, the heat transfer circuit 1 may represent a chiller that cools a process fluid such as water or the like. In an embodiment, the heat transfer circuit 1 may represent an air conditioner and/or a heat pump that cools and/or heats a process fluid such as air, water, or the like.

During the operation of the heat transfer circuit 1, a working fluid (e.g., refrigerant, refrigerant mixture, or the like) flows into the compressor 10 from the evaporator 40 in a gaseous state at a relatively lower pressure. The compressor 10 compresses the gas into a high pressure state, which also heats the gas. After being compressed, the relatively higher pressure and higher temperature gas flows from the compressor 10 to the condenser 20. In addition to the working fluid flowing through the condenser 20, a first process fluid $PF_1$ (e.g., external air, external water, chiller water, or the like) also separately flows through the condenser 20. The first process fluid absorbs heat from the working fluid as the first process fluid $PF_1$ flows through the condenser 20, which cools the working fluid as it flows through the condenser. The working fluid condenses to liquid and then flows into the expansion device 30. The expansion device 30 allows the working fluid to expand, which converts the working fluid to a mixed vapor and liquid state. An "expansion device" as described herein may also be referred to as an expander. In an embodiment, the expander may be an expansion valve, expansion plate, expansion vessel, orifice, or the like, or other such types of expansion mechanisms. It should be appreciated that the expander may be any type of expander used in the field for expanding a working fluid to cause the working fluid to decrease in pressure and temperature. The relatively lower temperature, vapor/liquid working fluid then flows into the evaporator 40. A second process fluid $PF_2$ (e.g., air, water, or the like) also flows through the evaporator 40. The working fluid absorbs heat from the second process fluid $PF_2$ as it flows through the evaporator 40, which cools the second process fluid $PF_2$ as it flows through the evaporator 40. As the working fluid absorbs heat, the working fluid evaporates to vapor. The working fluid then returns to the compressor 10 from the evaporator 40. The above-described process continues while the heat transfer circuit 1 is operated, for example, in a cooling mode.

Figure 2:
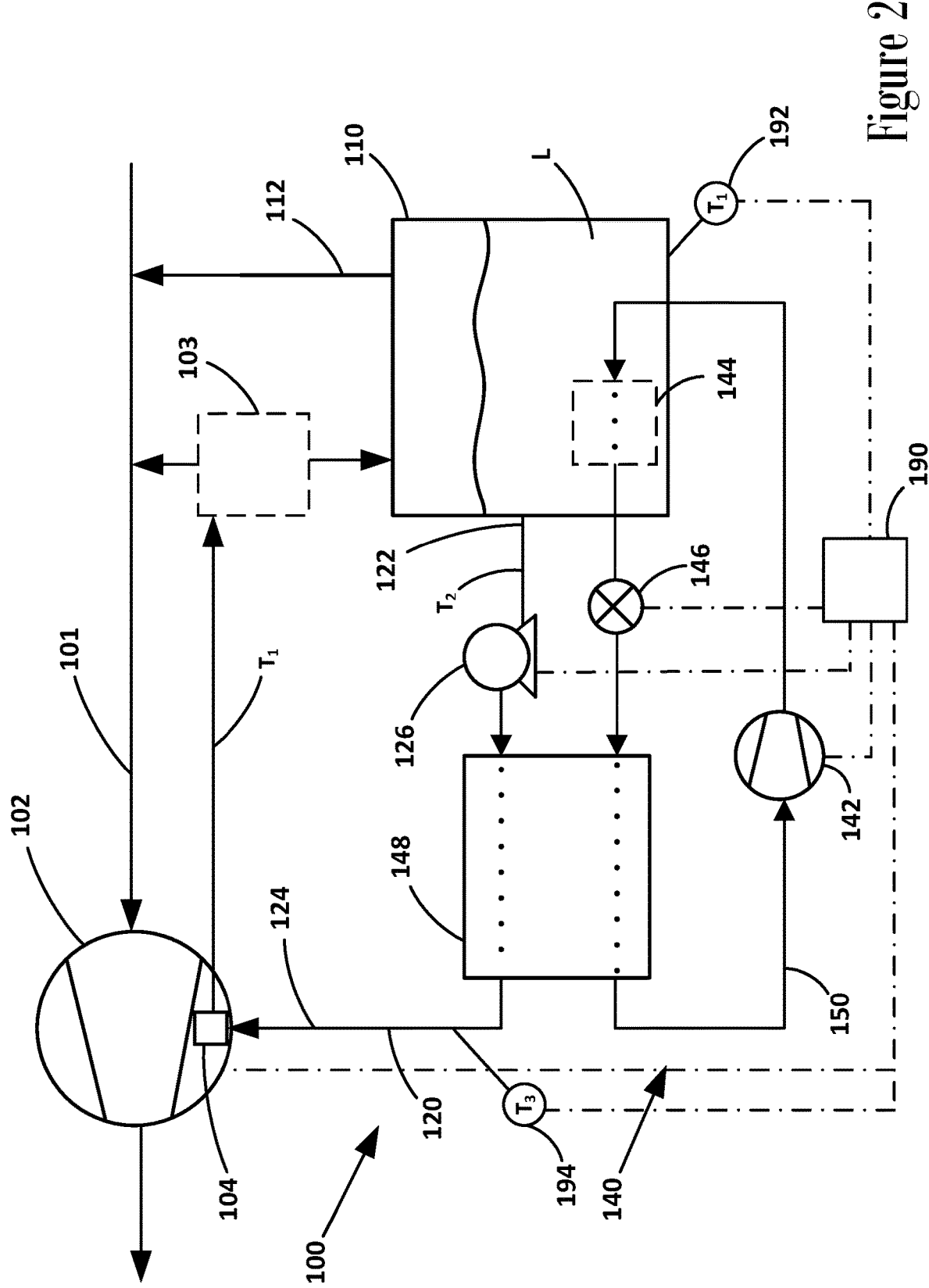
FIG. 2 is a schematic diagram of an embodiment of a compressor in a heat transfer circuit and a lubricant supply system for said compressor.

FIG. 2 is a schematic diagram of an embodiment of a compressor 102 and a lubricant supply system 100 for the compressor 102. The compressor 102 can be the compressor 10 in FIG. 1. For example, as similarly discussed for the compressor 10 in FIG. 1, the compressor 102 is part of a heat transfer circuit in an HVACR system (e.g., heat transfer circuit 1, etc.) that compresses a first working fluid to provide heating and/or cooling. In an embodiment, the compressor 102 is a centrifugal compressor. The lubricant supply system 100 is configured to provide lubricant to lubricate the compressor 102. The lubricant supply system 100 at least supplies lubricant to the one or more moving parts of the compressor 102 (e.g., bearing, scrolls, rotors, impellers etc.). In the illustrated embodiment, the supply system 100 supplies lubricant to at least one or more bearing(s) 104 of the compressor 102.

The first working fluid circulating in the heat transfer circuit 102 and that is compressed by the compressor 102 includes a refrigerant (e.g., a single refrigerant, a refrigerant blend, or the like). In an embodiment, the refrigerant is a low GWP refrigerant such as R513A refrigerant, R514A refrigerant, R515B refrigerant, R1233zd(E) refrigerant, and/or R1234ze(E) refrigerant, and the like (e.g., having a GWP of less than 750, having a GWP of less than 600). In an embodiment, the lubricant includes oil.

Dashed dotted lines are provided in the Figures to illustrate electronic communications between different features. For example, in FIG. 2, a dashed dotted line extends from a controller 190 to a temperature sensor 192 as the controller 190 receives measurements (e.g., temperature measurements) from the temperature sensor 192. For example, a dashed-dotted line extends from the controller 190 to the compressor 142 as the controller 190 controls the compressor 142. In an embodiment, the controller 190 includes memory for storing information and a processor. The controller 190 in FIG. 2 and described below is described/shown as a single component. However, it should be appreciated that a "controller" as shown in the Figures and described herein may include multiple discrete or interconnected components that include a memory and a processor in an embodiment. In an embodiment, the controller 190 may be a controller of the HVACR system of the compressor 102. In an embodiment, the controller 190 may be the controller of the compressor 102.

The lubricant supply system 100 includes a lubricant tank 110, a lubricant pathway 120, and a lubricant refrigeration system 140. Lubricant is supplied from the lubricant tank 110 to the bearing(s) 104 of the compressor 102 through the lubricant pathway 120. The lubricant refrigeration system 140 is configured to heat the lubricant L within the lubricant tank 110 and to cool the lubricant L as it flows through the lubricant pathway 120. The lubricant supply system 100 can also include the controller 190 configured to control the operation of the lubricant supply system 100.

The lubricant tank 110 is configured to store lubricant L to be circulated back to the bearing(s) 104 of the compressor 102 through the lubricant pathway 120. The lubricant tank 110 may be disposed internal to the compressor 102 or external to the compressor 102 as shown in FIG. 2. In an embodiment, the lubricant tank 110 may be a lubricant sump of the compressor 102. In such an embodiment, the lubricant may be configured to drain into the lubricant tank 110 from the bearing(s) 104 of the compressor 102. In an embodiment, the lubricant tank 102 may be a tank disposed external to the compressor 102 as shown in FIG. 2. In such an embodiment, the lubricant supply system 100 may include an external lubricant separator (e.g., lubricant separator 103 or the like) configured to separate working fluid from the lubricant flowing/draining from the bearing(s) 104 and direct the separated lubricant into the lubricant tank 110. In another embodiment, the heat transfer circuit 101 of the compressor 102 may include a lubricant separator that separates lubricant from the compressed working fluid and supplies the separated lubricant back to the lubricant tank 110. In an embodiment, the lubricant tank 110 may be an internal lubricant tank disposed within the compressor 102. In an embodiment, the lubricant separator 103 can be disposed within the compressor 102.

The lubricant pathway 120 includes an inlet 122 and an outlet 124. The inlet 122 is connected to the lubricant tank 110 and the lubricant L flows into the lubricant pathway 120 through inlet 122. Lubricant L is supplied from the outlet 124 of the lubricant pathway 120 to the bearing(s) 104 of the compressor 102. For example, the outlet 124 of the lubricant pathway 120 connects to the moving part(s) of the compressor 102. The outlet 124 may have branches that each connect to a respective bearing(s) 104 of the compressor 102. For example, the lubricant pathway 120 can extend from the lubricant tank 110 to the bearing(s) 104 of the compressor 102.

As shown in FIG. 2, the lubricant pathway 120 includes a lubricant cooler 148 of the lubricant refrigeration system 140. The lubricant cooler 148 is configured to cool the lubricant L as it flows through the lubricant pathway 102.

The lubricant cooler 148 is a heat exchanger that cools the lubricant using a second working fluid flowing through the lubricant refrigeration system 140. The lubricant and the working fluid flow through the lubricant cooler 148 without mixing while allowing the lubricant and the second working fluid to exchange heat. The working fluid adsorbing heat from the flowing lubricant causing cooling of the lubricant and heating of the working fluid as they each flow through the lubricant cooler 148. In an embodiment, the lubricant cooler 148 can be, for example, a brazed plate heat exchanger. The lubricant refrigeration system 140 is discussed in more detail below.

The lubricant pathway 120 can also include a pump 126 for pumping the lubricant L through the lubricant pathway 120. In an embodiment, the pump 126 is a positive displacement pump. For example, the operation of the pump 126 suctions the lubricant L from the lubricant tank 110 into the inlet 122 of the lubricant pathway 120, passes the lubricant through the lubricant pathway 120, discharges the lubricant L from outlet 124 to the bearing(s) 104 of the compressor 102. In an embodiment, the pump 126 may be disposed within lubricant tank 110. For example, the pump 126 may be a submersible pump that is disposed in the lubricant L within the lubricant tank 110 and provides lubricant L to the inlet 122 of the lubricant pathway 120.

In an embodiment, the lubricant refrigeration system 140 is configured to heat and cool the lubricant L. The lubricant refrigerant system 140 includes a compressor 142, a lubricant heater 144, an expander 146, and the lubricant cooler 148 fluidly connected in a refrigeration circuit 150. The compressor 142 in the lubricant refrigeration system 140 may be referred to as an auxiliary compressor, while the compressor 102 can be referred to as a primary compressor.

In the illustrated embodiment, the refrigerant circuit 150 is a vapor compression system that compresses and expands a second working fluid (e.g., refrigerant, refrigerant mixture, or the like) to provide cooling and heating. For example, the refrigerant circuit 150 operates in a similar manner as described for the heat transfer circuit 1 in FIG. 1. During operation of the refrigerant circuit 150, working fluid is circulated through the auxiliary compressor 142, the lubricant heater 144, the expander 146, and the lubricant cooler 150. The lubricant heater 144 is a condenser heat exchanger that condenses the working fluid flowing therethrough with the lubricant L stored in the lubricant tank 110. The lubricant cooler 150 is an evaporator heat exchanger that evaporates the working fluid flowing therethrough using the lubricant flowing through the lubricant pathway 120. The working fluid is compressed in the compressor 142, cooled and condensed in the lubricant heater 144, expanded in the expander 146, and then heated and evaporated in the lubricant cooler 148 as similarly discussed for working fluid flowing through the compressor 10, condenser 20, expander 30, and the evaporator 40 in FIG. 1. As shown in FIG. 2, the refrigerant circuit 150 is fluidly separate from the heat transfer circuit 1 of the compressor 102.

The lubricant heater 144 is configured to heat the lubricant to increase the temperature $T_1$ of the lubricant in the lubricant tank 110 and that flows into the lubricant pathway 120. The lubricant heater 144 may be configured to heat the lubricant within the lubricant tank 110 and/or to heat the lubricant as it flows from the bearing(s) 104 to the lubricant tank 110. The lubricant heater 144 can be disposed between the compressor 102 and the lubricant tank 110 (e.g., in the lubricant discharge flow path from the bearing(s) 104 to the lubricant tank 110) or at the lubricant tank 110 (e.g., in the lubricant tank, on the lubricant tank 110, or the like). For example, the lubricant heater 144 in an embodiment may be disposed at the lubricant tank 110 by being disposed in the lubricant tank 140 as shown in FIG. 2. For example, the lubricant supply system 100 may include the lubricant heater 144 disposed between the compressor 102 and the lubricant tank 110 by being disposed in the lubricant separator 103 (e.g., lubricant separator 300 in FIG. 5, or the like), in the discharge flow path from the bearing(s) 104 between the compressor 102 and the lubricant separator 103 or between the lubricant separator 103 and the lubricant tank 110, in different component disposed between the lubricant separator 103 and the lubricant tank (e.g., a pressure vessel), or the like.

As shown in FIG. 2, the lubricant heater 144 is disposed in the lubricant tank 140. In particular, the lubricant heater 144 can be disposed in the lubricant L within the lubricant tank 110 (e.g., submerged in the lubricant L). The lubricant heater 144 is a heat exchanger configured to exchange heat from the flowing working fluid to the lubricant L, without the working fluid and lubricant L physically mixing. In an embodiment, the lubricant heater 144 may be a tube (e.g., a finned tube) that extends through the liquid lubricant L and is configured to exchange heat through the walls of the lubricant pathway to the surrounding lubricant L. In an embodiment, the lubricant heater 144 may be disposed outside of the lubricant tank 110. In such an embodiment, lubricant supply system 100 can be configured to circulate the lubricant L in the lubricant tank through the external lubricant heater (e.g., from the lubricant tank 110 through the external lubricant heater and then back into the lubricant tank 110) such that the external lubricant heater heats up lubricant within the lubricant tank 110. The lubricant L in the lubricant tank 110 adsorbs heat from the hotter working fluid flowing through the lubricant heater 144 which cools the working fluid and heats the lubricant L.

The solubility of the refrigerant in the lubricant decreases as the temperature of the lubricant increases. As the lubricant is heated by the lubricant heater 144, the dissolved gaseous refrigerant is separated/rejected from liquid lubricant. The lubricant supply system 100 is configured to vent the separated gaseous refrigerant back to the heat transfer circuit 101. For example, the separated gaseous refrigerant is vented back to the evaporator in the heat transfer circuit 101 (e.g., evaporator 40 in FIG. 1 and the like). As shown in the illustrated embodiment, the lubricant tank 110 can include a vent outlet 112 configured to vent the gaseous refrigerant from the lubricant tank 110 to the refrigerant circuit 101. In an embodiment, the vent outlet 112 may vent the gaseous refrigerant from the lubricant tank 110 to the refrigerant circuit 101 via the lubricant separator 103 (e.g., vent outlet 112 vents into the lubricant separator 103, which in turn is configured to vent the gaseous refrigerant into the refrigerant circuit 101).

The cooled working fluid then flows through the expander 146 to the lubricant cooler 148. The working fluid expands and cools further as it flows through the expander 146. The cooler working fluid and the lubricant in the lubricant pathway 120 each separately flow through the lubricant cooler 148 without mixing. The cooler working fluid and the lubricant in the lubricant pathway 120 exchange heat as they separately flow through the lubricant cooler 148. The cooler working fluid adsorbs heat from the lubricant, which heats and evaporates the working fluid and cools the lubricant. The heated working fluid then flows back to the auxiliary compressor 142.

In an embodiment, the lubricant refrigeration system 140 is configured to simultaneously heat the lubricant L and cool the lubricant L. The lubricant refrigeration system 140 heats the lubricant L within the lubricant tank 110 and cools the lubricant L flowing through the lubricant pathway 120 simultaneously. For example, the upstream lubricant is heated as it flows through the lubricant heater 144 while at the same time downstream is being cooled as it flows through the lubricant cooler 148. The lubricant refrigeration system 140 is configured to heat the lubricant L to remove dissolved refrigerant from the lubricant L (e.g., to degas the lubricant L). The gaseous refrigerant removed from the lubricant L may then be separately directed out of the lubricant tank 110. The lubricant refrigerant system 140 is configured to cool the heated lubricant L in the lubricant pathway 120 as it flows from the lubricant tank 110 through the lubricant pathway 120 to increase the viscosity of the lubricant L. For example, the inlet 122 of the lubricant pathway 120 is configured to connect to the lubricant tank 110 below the liquid level of the lubricant L within the lubricant tank 110 so as to prevent gaseous refrigerant within the lubricant tank 110 from entering the lubricant pathway 120. As the lubricant L is not in contact with refrigerant (e.g., gaseous refrigerant) within the lubricant pathway 120, the lubricant L is cooled within the lubricant pathway 120 and delivered to the bearings 104 to avoid having refrigerant re-dissolving into the lubricant. The lubricant is delivered to the bearings 110 being less saturated with the refrigerant (e.g., less than fully saturated with the refrigerant for its delivered temperature $T_3$ and pressure).

The lubricant supplied from the outlet 124 of the lubricant pathway 120 has a decreased diluted refrigerant concentration while having a suitable viscosity for providing lubrication. The lubricant refrigeration system 140 (e.g., by the controller 190) can be configured to control the heating and cooling of the lubricant such that the lubricant supply system 100 supplies the lubricant having more than a predetermined minimum viscosity and containing less than a predetermined concentration of refrigerant.

For example, lubricant may enter the lubricant tank 110 at a first temperature $T_1$. The lubricant within the lubricant tank 144 is heated by the lubricant heater 144 of the lubricant refrigeration system 140 from the first temperature $T_1$ to a higher second temperature $T_2$. The lubricant refrigerant system 140 may be configured to heat the lubricant L within the lubricant tank 110 to be at or above a predetermined minimum temperature (e.g., lubricant temperature $T_2 \geq$ predetermined minimum temperature). The predetermined minimum temperature may be based on a desired dissolved refrigerant concentration for the lubricant. For example, as the lubricant is heated by the lubricant heater 144, the dissolved gaseous refrigerant is separated/liberated from liquid lubricant such that the lubricant L entering the lubricant pathway 120 is at or below the desired dissolved refrigerant concentration (e.g., lubricant temperature $T_2$ is at or above the predetermined temperature that corresponds to a predetermined maximum refrigerant concentration limit for the lubricant). In an embodiment, the maximum refrigeration concentration for the lubricant supplied from the lubricant pathway 102 is 40 wt % of refrigerant. In an embodiment, the maximum refrigerant concentration for the lubricant supplied from the lubricant pathway 120 is 25 wt % of refrigerant (e.g., the dissolved refrigerant being 25 wt % of the lubricant). In an embodiment, the maximum refrigerant concentration for the lubricant supplied from the lubricant pathway 120 is 20 wt % refrigerant.

A portion of the lubricant within the lubricant tank 110 then flows through the lubricant pathway 120 and is cooled by the lubricant cooler 148 of the lubricant refrigeration system 140 from the second temperature $T_2$ to a third temperature $T_3$ (e.g., first temperature $T_1$<second temperature $T_2$>third temperature $T_3$). The lubricant refrigerant system 140 may be configured to cool the lubricant in the lubricant pathway 120 to be at or below a predetermined maximum temperature (e.g., lubricant temperature $T_3 \geq$ predetermined maximum temperature). The predetermined maximum temperature may be based on, for example, a desired viscosity for the lubricant supplied from the lubricant pathway 120 (e.g., desired viscosity of the lubricant being supplied to the bearing(s) 4 of the compressor 102). In an embodiment, the viscosity of the lubricant supplied from the lubricant pathway 120 has a viscosity of 5-40 cSt. In an embodiment, the viscosity of the supplied from the lubricant pathway 120 has a viscosity of 10-35 cSt. In an embodiment, the viscosity of the supplied from the lubricant pathway 120 has a viscosity of 15-25 cSt.

In an embodiment, the temperature sensors 192, 194 can be used by the controller 190 to detect the temperature $T_2$ of the lubricant L within the lubricant tank 110 and/or the temperature $T_3$ of the lubricant discharged from the lubricant cooler 148 in the lubricant pathway 120. The controller 190 can be configured to control the components of the lubricant supply system 100 to control the heat and cooling of the working fluid. For example, the controller 190 may be configured to control one or more of operation of the auxiliary compressor 142 (e.g., discharge pressure of the compressor 142, speed of the auxiliary compressor 142, or the like), of the expander 140 (e.g., degree open/closed of an electronic expansion valve, and the like), and/or of the pump 126 (e.g., pump speed) to control the heating and cooling provided to the lubricant.

In an embodiment, the refrigeration circuit 150 can be modified to include additional components. For example, the refrigeration circuit 150 in an embodiment can include an economizer heat exchanger, one or more flow control devices, a receiver tank, a dryer, a suction-liquid heat exchanger, or the like. In an embodiment, the refrigeration circuit 150 may include a secondary evaporator to remove excess cooling and/or a secondary condenser to remove excess heat from the refrigeration circuit 150. The working fluid can contain excess heat due to the working fluid providing both heating and cooling to the lubricant. For example, the operating conditions to provide the desired heating of the lubricant within the lubricant tank 140 (e.g., discharge pressure of the compressor 142, flowrate of the working fluid through the lubricant heater 144) may result in the working fluid having excess heat when flowing into the expander 146 or not being sufficiently heated/evaporated within the lubricant cooler 148. For example, the secondary evaporator can be located after the lubricant cooler 148 and before the compressor 142 in the refrigerant circuit 150 and can be configured to heat the working fluid with a process fluid (e.g., air, water, or the like) when the lubricant is not adsorbing sufficient heat from the working fluid in the lubricant cooler 148 (e.g., does not sufficiently heat/evaporate the working fluid). For example, the secondary condenser can be located after the compressor 142 and before the expander 146 in the refrigerant circuit 150 and can be configured to heat the working fluid with a process fluid (e.g., air, water, or the like) when the operation of the refrigerant circuit 150 result in the lubricant heater 148 not removing sufficient heat from the working fluid.

In another embodiment, the refrigerant system 140 may be part of the heat transfer circuit 101. The refrigeration circuit 150 can be configured to utilize the working fluid from the heat transfer circuit 101 instead of a separate working fluid to cool the lubricant flowing through the lubricant cooler 148. For example, the refrigeration circuit 150 can be fluidly connected to the heat transfer circuit 101 (e.g., having an inlet and an outlet connected to the heat transfer circuit 101) and can utilize a portion of the first working fluid from the heat transfer circuit 101 (e.g., from downstream of the expander 30 and upstream of the evaporator 40 in FIG. 1, or from the evaporator 40 in FIG. 1) through the lubricant cooler 148 to cool the lubricant flowing in the lubricant pathway 120.

Figure 3:
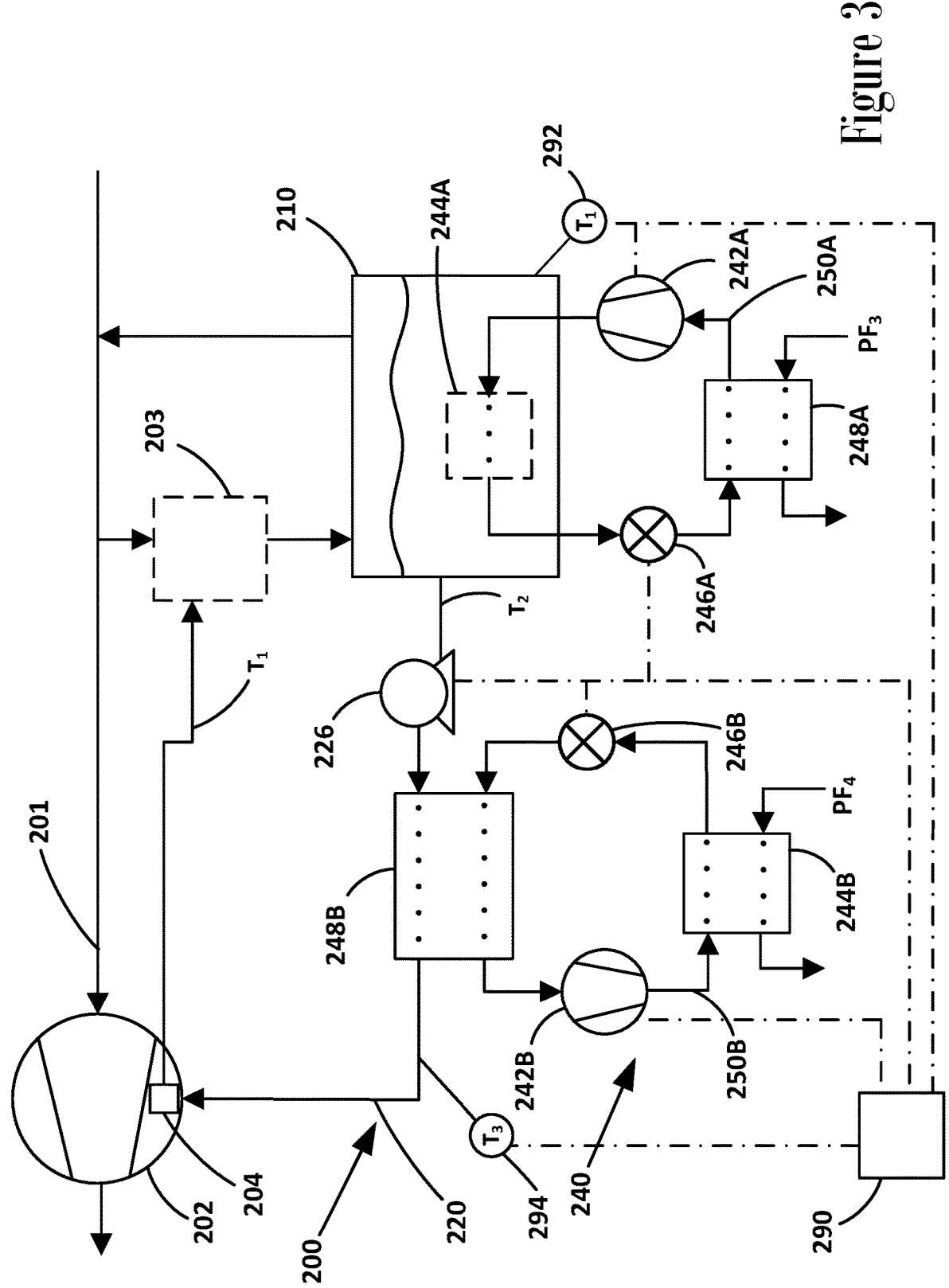
FIG. 3 is a schematic diagram of an embodiment of a compressor in a heat transfer circuit and a lubricant supply system for said compressor.

In an embodiment, the lubricant heater 144 can be an electric heater (e.g., lubricant heater 370 in FIG. 5) or part of a separate refrigerant circuit (e.g. refrigerant circuit 250A in FIG. 3).

FIG. 3 is a schematic diagram of another embodiment of a lubricant supply system 200 for a compressor 202. The compressor 202 can have similar features as described for the compressor 102 in FIG. 2. For example, the compressor 202 is configured to compress a first working fluid (e.g., refrigerant, refrigerant mixture, or the like) in a heat transfer circuit 201. The lubricant supply system 200 can have a similar configuration as the lubricant supply system 100 in FIG. 1 except for the configuration of the lubricant refrigeration system 240. For example, the lubricant supply system 200 includes a lubricant tank 210 containing lubricant L and a lubricant heater 244A; and a lubricant pathway 220 configured to supply the lubricant from the lubricant tank 210 and that includes a lubricant cooler 248B similar to the lubricant supply system 100 in FIG. 2. It should be appreciated that in an embodiment, the lubricant tank 210, the lubricant pathway 220, and/or compressor 202 may have features similar to those discussed above with respect to lubricant tank 110, the lubricant pathway 120, and the compressor 102 in FIG. 2. For example, the lubricant may be circuited back into the lubricant tank 210 via a lubricant separator 203 as similarly discussed above with respect to the lubricant separator 103 in FIG. 2. For example, the lubricant heater 244A in an embodiment may be disposed external to the lubricant tank 210 as similarly discussed for the lubricant heater 144 of FIG. 2.

The lubricant refrigeration system 240 is configured to heat the lubricant L in the lubricant tank 210 and to cool the heated lubricant L as it flows through the lubricant pathway 220. The lubricant refrigeration system 240 generally heats and cools the lubricant L in a similar manner as discussed above for the lubricant refrigeration system 140 in FIG. 2. For example, the lubricant refrigeration system 240 includes the lubricant heater 244A that heats the lubricant L within the lubricant tank 210 (e.g., heats the lubricant L from temperature $T_1$ to temperature $T_2$) and the lubricant cooler 248B that cools the heated lubricant flowing through the lubricant pathway 220 (e.g., cools the lubricant from temperature $T_2$ to temperature $T_3$ in the lubricant pathway 220).

As shown in FIG. 3, the lubricant refrigeration system 240 includes a first refrigerant circuit 250A and a second refrigerant circuit 250B. As shown in FIG. 3, the first and second refrigerant circuits 250A, 250B are fluidly separate from each other and the heat transfer circuit 201 of the compressor 202. The first refrigerant circuit 250A is vapor compression system that compresses and expands a second working fluid (e.g., a refrigerant, refrigerant mixture, or the like) to provide heating of the lubricant L within the lubricant tank 210. The second refrigerant circuit 250B is a vapor compressor system that compresses and expands a third working fluid (e.g., including a refrigerant, refrigerant mixture, or the like) to provide cooling of the heated lubricant L as it flows through the lubricant pathway 220.

The first refrigerant circuit 250A includes a first auxiliary compressor 242A, the lubricant heater 244A, a first expander 246A, and an evaporator 248A. During operation of the first refrigerant circuit 250A, the second working fluid is circulated through the first auxiliary compressor 242A, the lubricant heater 244A, the expander 246A, and the evaporator 248A in that order. The lubricant heater 244A is a condenser heat exchanger that condenses the second working fluid flowing therethrough with the lubricant L stored in the lubricant tank 210. The first refrigerant circuit 250A can operate to compress and expand its second working fluid in a similar manner as described for the heat transfer circuit 1 in FIG. 1. For example, the second working fluid is compressed in the first auxiliary compressor 242A, cooled and condensed in the lubricant heater 244A, expanded in the first expander 246A, and then heated and evaporated in the evaporator 248A as similarly discussed for working fluid flowing through the compressor 10, condenser 20, expander 30, and the evaporator 40 in FIG. 1. The lubricant L within the lubricant tank 210 is heated as it adsorbs heat from the relatively hotter, compressed second working fluid discharged from the first auxiliary compressor 242A as the second working fluid separately flows through lubricant heater 244A, which heats the lubricant L within the lubricant tank 210. The evaporator 248A is a heat exchanger configured to exchange heat between the second working fluid and a process fluid $PF_3$ (e.g., external air, water, and the like) without physically mixing. The second working fluid adsorbs heat from the process fluid $PF_3$ and is heated within the evaporator 248A, which also cools the process fluid $PF_3$. The process fluid $PF_3$ may be the same or a different process fluid from a process fluid heated or cooled by heat transfer circuit 1 of the compressor 202 (e.g., process fluid $PF_1$, process fluid $PF_2$).

The second refrigerant circuit 250B includes a second auxiliary compressor 242B, a condenser 244B, a second expander 246B, and the lubricant cooler 248B. During operation of the second refrigerant circuit 250B, the third working fluid is circulated through the second auxiliary compressor 242B, the condenser 244B, the second expander 246B, and the lubricant cooler 248B in that order. The lubricant cooler 248B is an evaporator heat exchanger that evaporates the third working fluid flowing therethrough with the lubricant flowing through lubricant pathway 220. The second refrigerant circuit 250B can operate to compress and expand its third working fluid in a similar manner as described for the heat transfer circuit 1 in FIG. 1. For example, the third working fluid is compressed in the second auxiliary compressor 242B, cooled and condensed in the condenser 244B, expanded in the second expander 246B, and then heated and evaporated in the evaporator 248B as similarly discussed for working fluid flowing through the compressor 10, condenser 20, expander 30, and the evaporator 40 in FIG. 1. The condenser 244B is a heat exchanger configured to exchange heat between the third working fluid and a process fluid $PF_4$ (e.g., air, external air, glycol and/or water, and the like) without physically mixing. The process fluid $PF_4$ adsorbs heat from the third working fluid and is heated within the evaporator 244B, which cools the third working fluid. The process fluid $PF_4$ may be the same or a different process fluid from a process fluid heated or cooled by heat transfer circuit 1 of the compressor 202 (e.g., process fluid $PF_1$, process fluid $PF_2$).

Figure 5:
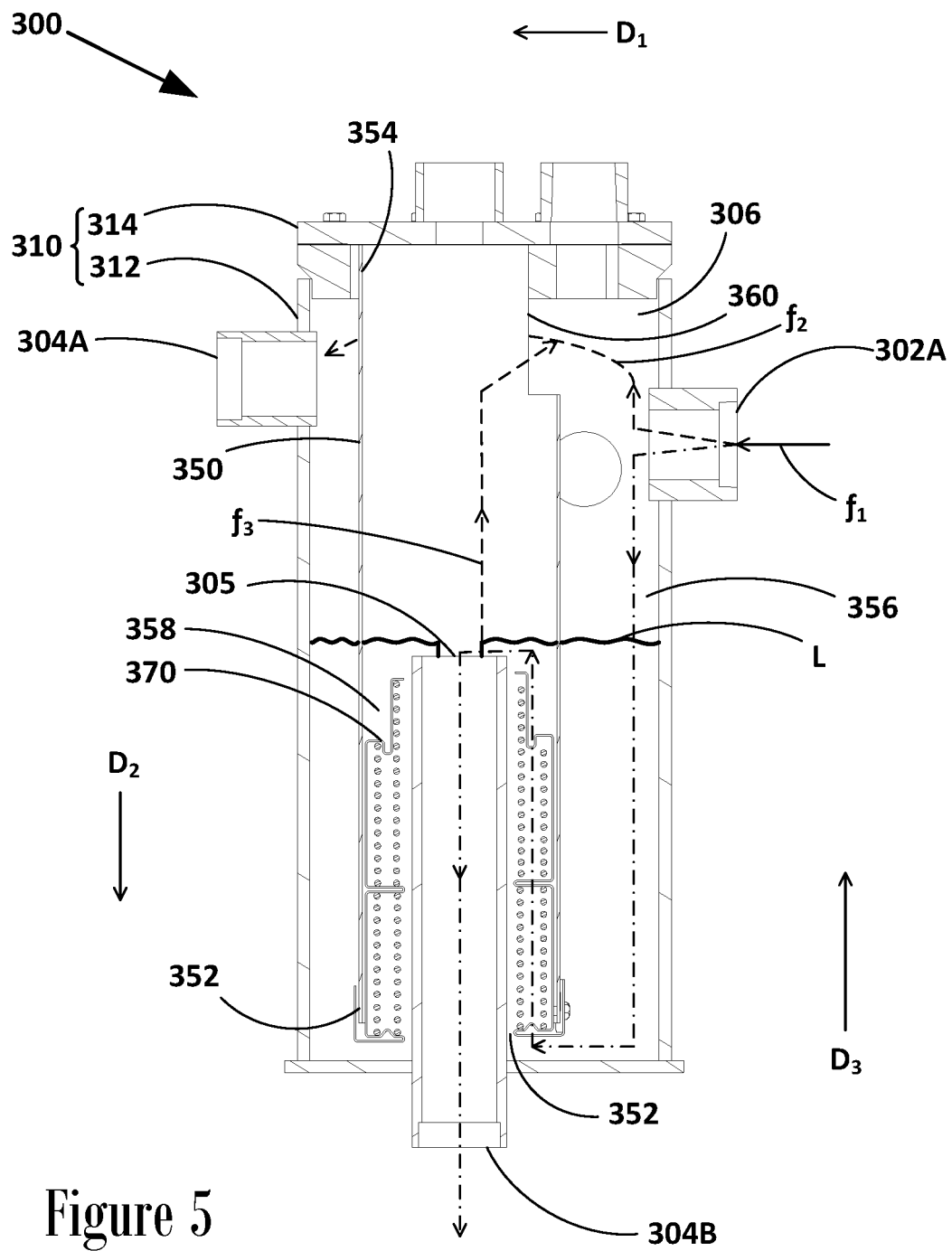
FIG. 5 is a vertical cross sectional view of the lubricant separator of FIG. 4, according to an embodiment.

In an embodiment, the lubricant heater 244A may be an electric heater (e.g., lubricant heater 370 in FIG. 5). In an embodiment, the lubricant cooler 244B may utilize a process fluid (e.g., process fluid $PF_1$, process fluid $PF_2$, Process fluid PF$_3$, process fluid PF$_4$, or the like) instead of the refrigerant circuit 250A to cool the lubricant flowing through the lubricant cooler. For example, the process fluid may flow through the lubricant cooler 244B and cool the lubricant instead of utilizing a working fluid.

The lubricant supply system 200 can also include a controller 290 configured to control the operation of the lubricant supply system 200. The controller 290 can have similar features as discussed for the controller 190 in FIG. 2. The controller 290 is configured to control operation of the first refrigerant circuit 250A and the second refrigerant circuit 250B such that the lubricant heater 244A sufficiently heats the lubricant L within the lubricant tank 210 (e.g., and the lubricant cooler 248B sufficiently cools the lubricant L flowing through the lubricant pathway 220. The controller 290 can be configured to heat and then cools the lubricant such that the lubricant supplied from the lubricant pathway is equal to or less than a predetermined viscosity limit (e.g., within a desired viscosity range, above a predetermined minimum viscosity limit) and contains less than a predetermined concentration of refrigerant, as similarly discussed above. For example, the controller 290 can be configured to operate the first refrigerant circuit 250A (e.g., control speed of the first auxiliary compressor 242A, discharge pressure of the first auxiliary compressor 242A, degree open/closed of the first expander 246A, and the like) so that the lubricant L within the lubricant tank 210 is heated to at or above the predetermined minimum temperature (e.g., lubricant temperature T$_2$≥predetermined minimum temperature). For example, the controller 290 can be configured to operate the second refrigerant circuit 250B (e.g., control speed of the second auxiliary compressor 242B, discharge pressure of the second auxiliary compressor 242B, degree open/closed of the second expander 246B, and the like) such that the lubricant in the lubricant pathway 220 is cooled to at or below the predetermined maximum temperature (e.g., lubricant temperature T$_3$≤predetermined maximum temperature).

Figure 4:
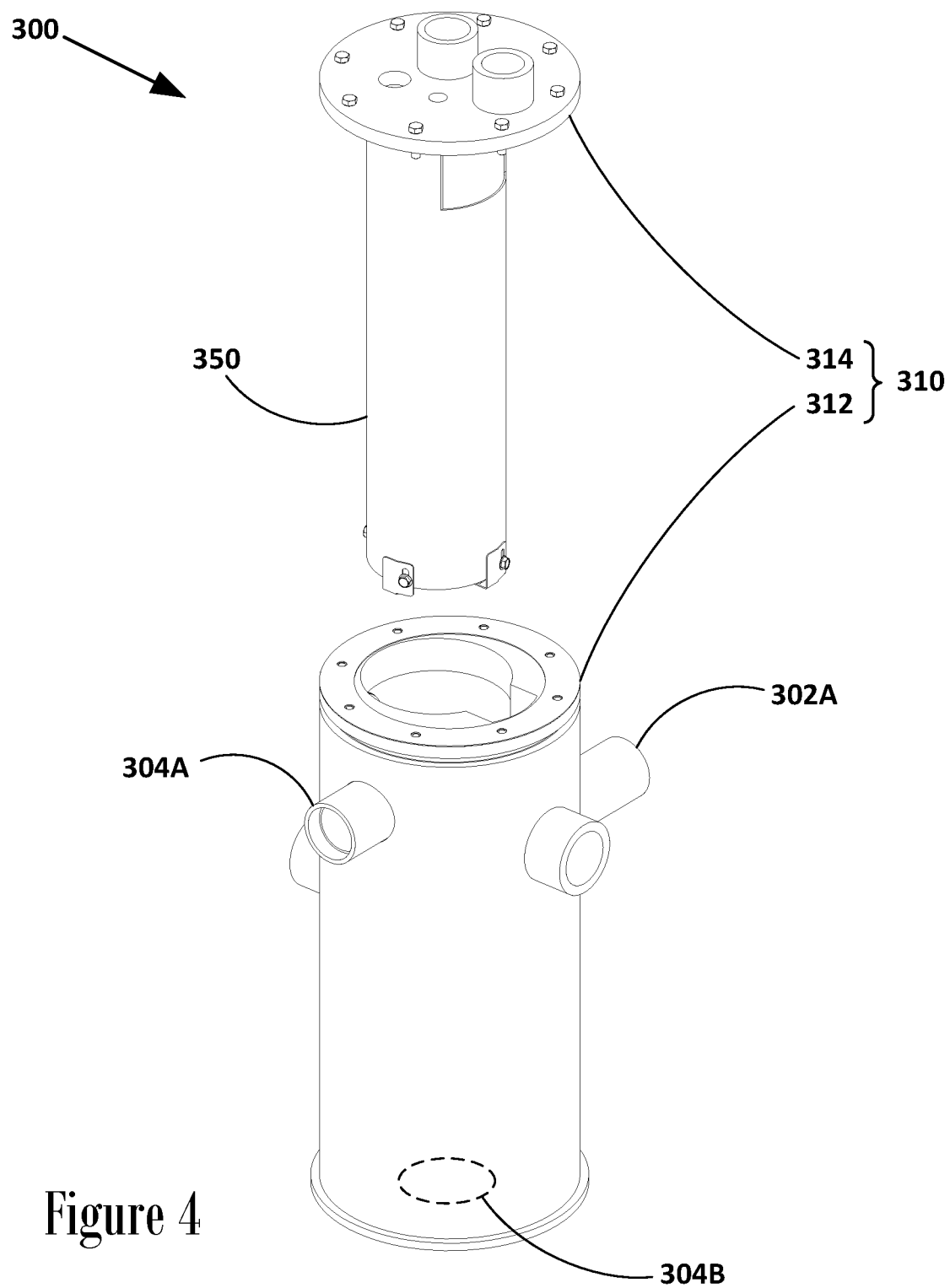
FIG. 4 is an exploded perspective view of an embodiment of a lubricant separator.

FIG. 4 is an exploded view of an embodiment of a lubricant separator 300 for a lubricant supply system. For example, the lubricant separator 300 in an embodiment may be the lubricant separator 103 in FIG. 2 or the lubricant separator 203 in FIG. 3. The lubricant separator 300 includes a housing 310. As shown in FIG. 4, the housing 310 includes a bottom portion 312 and a cover portion 314. When assembled (e.g., as shown in FIG. 5), the cover portion 314 is affixed to the bottom portion 312 (e.g., onto the top of the bottom portion 312) to form the housing 310.

The lubricant separator 300 includes one or more inlet(s) and outlets in the housing 310. The inlet(s) include a first inlet 302A that is a bearing lubricant return inlet configured to receive the bearing lubricant discharged from the bearings of the compressor (e.g., bearings 104 in FIG. 2, bearings 204 in FIG. 3, and the like). In an embodiment, the lubricant separator 300 can include multiple of the inlets 302A for receiving the bearing lubricant discharged from the bearings. For example, the lubricant separator 300 may have a respective inlet 302A for each bearing of the compressor, in which each inlet 302A receives the lubricant discharged from its respective bearing of the compressor. The lubricant fluid flowing into the lubricant separator 300 through the inlet 302A can include a two-phase mixture of liquid lubricant and gaseous refrigerant. For example, gaseous refrigerant leaks through the seals of the compressor and into the bearings, and the gaseous refrigerant is then discharged along with the liquid lubricant. The gaseous lubricant is discharged from a first outlet 304A of the lubricant separator 300, and liquid lubricant is discharged from the lubricant separator 300 through a second outlet 304B. For example, the second outlet 304B is configured to direct the liquid lubricant into the lubricant tank of the lubricant supply system (e.g., lubricant tank 110 in FIG. 2, lubricant tank 210 in FIG. 3, and the like)

The lubricant separator 300 includes a flow director 350 configured to direct the flow of fluids within the lubricant separator 300. In an embodiment, the flow director 350 has a tubular shape which extends from the cover portion 314 into the lubricant separator 300. In the illustrated embodiment, the flow director 350 has a circular tubular shape. It should be appreciated that the tubular shape of the flow director 350 in other embodiments may be a different tubular shape than circular (e.g., ellipse, square, triangular, octagonal, or the like). The flow director 350 is disposed within the lubricant separator 300 (e.g., within the housing 310) when assembled. The flow director 350 is used to redirect the flow of gas within the lubricant separator 300 such that the gaseous refrigerant contains minimal lubricant (e.g., containing little to no entrained lubricant) once it reaches and flows through first outlet 304A.

FIG. 5 shows a vertical cross-sectional view of the lubricant separator 300. Dashed arrows and dotted-dashed arrows are provided in FIG. 5 to show the flow of fluid through the lubricant separator 300. The dashed arrows indicate flow of gaseous refrigerant and the dotted-dashed arrows indicate flow of liquid lubricant within the lubricant separator 300.

In the illustrated embodiment, a mixture of gaseous refrigerant f$_1$ and liquid lubricant f$_2$ is discharged from the bearing(s) of the compressor and supplied to the inlet 302A of the lubricant separator 300 (e.g., the discharge from the bearing(s) 104, 204 to the lubricant separator 103, 203 in FIGS. 2 and 3). The mixture of gaseous refrigerant f$_1$ and liquid refrigerant f$_2$ flows through the inlet 302A into the internal space 306 of the lubricant separator 300. The flow director 350 is configured such that fluid flows around the flow director 350 (e.g., circumferentially around the flow director 350) to flow from the inlet 302A to the first outlet 304A within the internal space 306.

The flow director 350 extends downwardly within the housing 310. The flow director 350 has an open bottom end 352. For example, the bottom end 352 of the flow director 350 is opposite to its top end 354 that is connected to the cover portion 314. The second outlet 304B extends upwardly from the housing 310 into the flow director 350. The second outlet 304B extends upwardly (e.g., in direction D$_3$) through the open bottom end 352 of the flow director 350 into the flow director 350. The opening 305 of the outlet 304B (e.g., the inlet opening of the outlet 304B) is disposed within the flow director 350.

The flow director 350 forms a first channel 356 that extends downwardly (e.g., in direction D$_2$) from the first inlet 302A. The first channel 356 is disposed between the housing 310 (e.g., the bottom portion 312 of the housing 310) and the flow director 350. As shown in FIG. 5, the first channel 356 is formed by flow director 350 and the housing 310 (e.g., formed by the exterior of the flow director 350 and the interior of the housing 310). As the gaseous refrigerant f$_1$ flows around the flow director 350 to the outlet 304A, the liquid lubricant f$_2$ flows downward within the internal space 306 (e.g., in direction D$_2$). The liquid lubricant f$_2$ flows downward through the first channel 356. The first channel 356 configured to allow the liquid lubricant f$_2$ to flow downward while the gaseous refrigerant f$_1$ flows to the first inlet 304A. Gravity causes the liquid lubricant to flow downward through the first channel 356 away from the gaseous refrigerant $f_1$ while the gaseous refrigerant $f_1$ flows circumferentially around the flow director 350.

The flow director 350 forms a second channel 358 that extends upwardly (e.g., in direction $D_3$) within the flow director 350. The second channel 358 is disposed between the outlet 304B and the flow director 350. As shown in FIG. 5, the second channel 358 is formed by the flow director 350 and outlet 304B (e.g., formed by the exterior of the outlet 304B and the interior of the flow director 350). The liquid lubricant $f_2$ flows upward through the second channel 358 (e.g., in direction $D_3$) to the opening 305 of the outlet 304B, and then flows downward (e.g., in direction $D_2$) through the outlet 304B and out of the lubricant separator 300. The first channel 356 and the second channel 358 are formed on opposite sides of the flow director 350 (e.g., an exterior side and an interior side of the flow director 350, respectively) and are configured to direct fluid in different directions, e.g. in opposite directions as shown in FIG. 5. The bottom end 352 of the second channel 358 is spaced apart from the housing 310 such that the liquid lubricant $f_2$ flows from the first channel 356 into the second channel 358.

The first channel 356 and the second channel 358 each have an annular shape (e.g., when viewed in direction $D_2$). The annular shape of the first channel 356 encircles the flow director 350 (e.g., along direction $D_3$). The annular shape of the second channel 358 encircles the outlet 304B (e.g., along direction $D_3$). In the illustrated embodiment, the channels 356, 358 are shaped to have a circular annular shape. It should be appreciated that the channels 356, 358 in an embodiment may have a different annular shape (e.g., square annular shape, triangular annular shape, ellipse annular shape, or the like). In an embodiment, the upward and downward flows of lubricant through the first and second channels 356, 358 are angled downward and/or angled upward, respectively. It should also be appreciated that the flow director 350 and/or the housing 310 may include additional flow direction features (e.g., baffles and the like) to help direct the flow of liquid lubricant and gaseous refrigerant within the lubricant separator and separate entrained lubricant from the gaseous refrigerant.

The lubricant separator 300 includes a lubricant heater 370 in the internal space 306. The lubricant heater 370 is disposed within the flow director 350 between the bottom end 352 of the flow director 350 and the opening 305 of the outlet 304B. The lubricant flows through/over the lubricant heater 370 as the lubricant flows through the flow director 350 to the opening 305 of the outlet 304B. The lubricant heater 370 is configured to heat the lubricant as it flows through the flow director to the outlet 304B. For example, the lubricant heater 370 in an embodiment is configured to heat the lubricant 350 to a desired temperature in a similar manner as discussed with the lubricant heater 144 in FIG. 2 or lubricant heater 244 in FIG. 3. The heated lubricant is then supplied from the lubricant separator 300 to the lubricant tank such that the lubricant in the lubricant tank has an increased temperature as similarly discussed with respect to the heating provided by the heater 144 in FIG. 2 or the lubricant heater 244A in FIG. 3. In the illustrated embodiment, the lubricant heater 370 is an electric heater with heating coils. The lubricant is heated as it flows across and contacts the heating coils. However, it should be appreciated that the lubricant heater 370 may be configured to be a heat exchanger with heat exchanger tube(s) containing flowing relatively hotter working fluid as similarly discussed for the lubricant heater 144 in FIG. 2 and the lubricant heat heater 244 in FIG. 3.

As the lubricant is heated by the lubricant heater 370, dissolved gaseous refrigerant $f_3$ is separated/liberated from the liquid lubricant L, $f_2$. The flow director 350 includes a vent opening 360 that allow the separated gaseous refrigerant $f_3$ to flow out of the flow director 350 and to the first outlet 304A. For example, the vent opening 360 allows separated gaseous refrigerant $f_3$ to join the gaseous refrigerant $f_1$ flowing from the inlet 302A to the first outlet 304A. The first outlet 304A can be configured to vent the gaseous refrigerant back to the heat transfer circuit (e.g. heat transfer circuit 1 in FIG. 1, heat transfer circuit 101 in FIG. 2, or heat transfer circuit 201 in FIG. 3) of the compressor (e.g., compressor 10 in FIG. 1, compressor 102 in FIG. 2, or compressor 202 in FIG. 3) as similarly discussed for the venting of the gaseous refrigerant from the lubricant tank 110 in FIG. 2 and/or from the lubricant tank 210 in FIG. 3.

Figure 6:
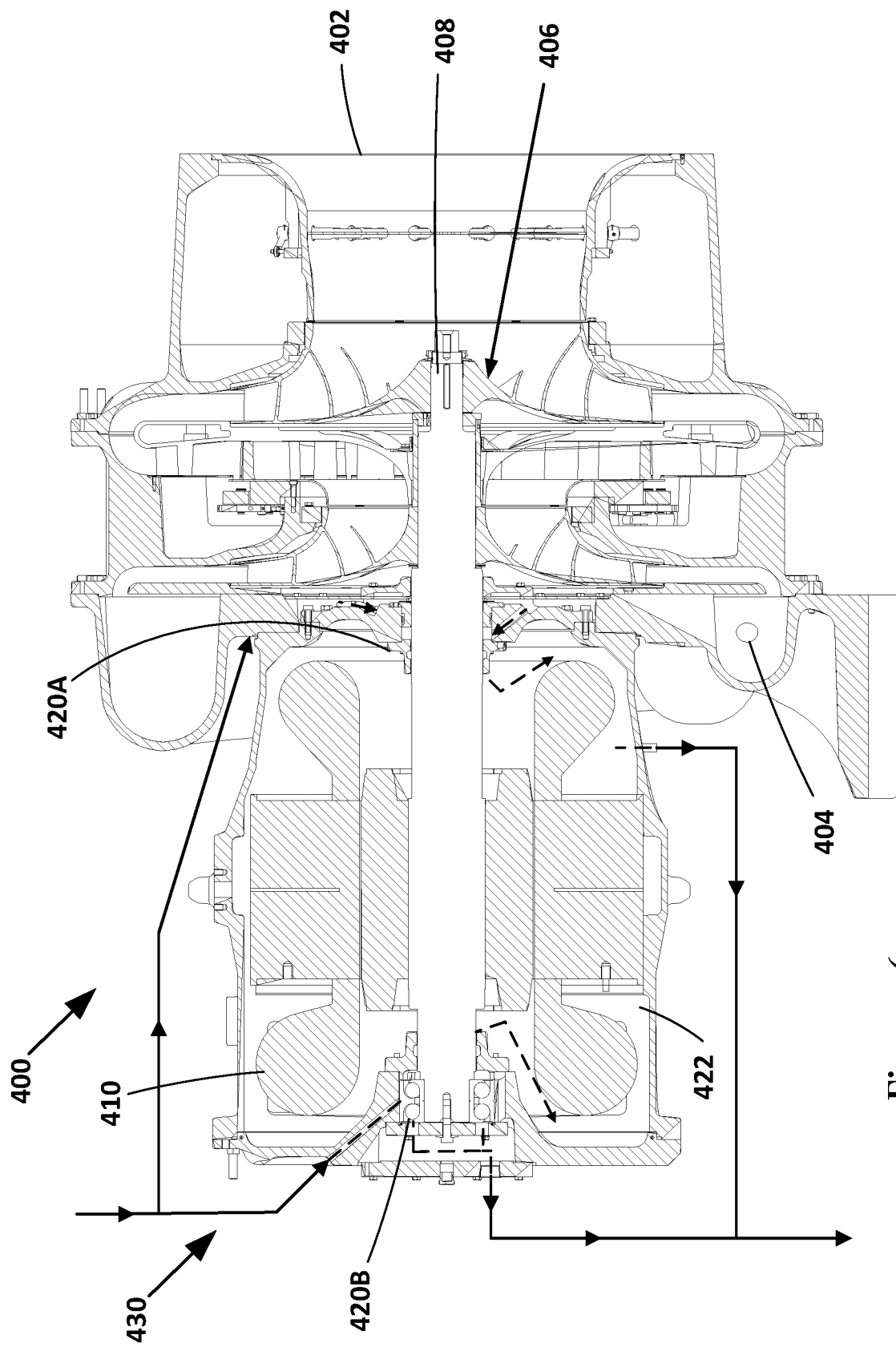
FIG. 6 is a vertical cross sectional view of an embodiment of a compressor.

FIG. 6 is a vertical cross-sectional view of a compressor 400. FIG. 6 illustrates an example of the flow of lubricant through a compressor 400. In an embodiment, the compressor 400 may be the compressor 10 in FIG. 1, the compressor 102 in FIG. 2, and/or the compressor 202 in FIG. 3. In an embodiment, the compressor 400 as shown in FIG. 6 is a centrifugal compressor. It will be appreciated that compressor utilizing the lubricant supply system herein may be another type of compressor, such as but not limited to for example, a scroll, screw, or the like.

The compressor 400 includes a suction inlet 402, a discharge outlet 404, a compression mechanism 406, a compressor shaft 408, a motor 410, and one or more bearings 420A, 420B. The motor 410 rotates the compressor shaft 408 which drives the compression mechanism 406. Refrigerant enters the compressor 400 through the suction inlet 402, is compressed by the compression mechanism 406, and the compressed refrigerant is discharged from the discharge outlet 404 of the compressor 400. The bearing(s) 420A, 420B provide support to moving parts (e.g., rotating components) of the compressor while allowing said moving parts to move. The bearings 420A, 420B are radial bearings. However, in another embodiment the bearing(s) supplied lubricant can be thrust bearings. For example, in FIG. 6, bearings 420A, 420B are radial bearings provide radial support for the compressor shaft 408 while it rotates. It should be appreciated that the bearing(s) 420A, 420B in an embodiment may be a different type of bearing (e.g., a thrust bearing, or the like).

A lubricant supply system 430 supplies lubricant to the bearing(s) 420A, 420B as similarly discussed for the lubricant supply system 100 in FIG. 2 and the lubricant supply system 200 in FIG. 3. Lubricant is supplied from the lubricant supply system 430 to the bearing(s) 420A, 420B, passes through the bearings 420A, 420B, and is then discharged from the bearing(s) 420B, 420B back to the lubricant supply system 430. While passing through the bearings 420A, 420B and/or within the compressor 400, the lubricant contacts/mixes with refrigerant (e.g., at bearing 420A). The lubricant may be discharged from the bearings 420A, 420B directly to the lubricant supply system 100 or via a sump 422 in the compressor 400. For example, when the compressor 400 includes a sump 422, the lubricant discharged from the bearings 420A, 420B pools in the sump 422 and then flows from the sump to the lubricant supply system 430.

In the illustrated embodiment, the lubricant supply system 430 is shown as being entirely external from the compressor 400. However, it should be appreciated that one or more components of the lubricant supply system 430 may be incorporated into the compressor. For example, in an embodiment, the sump 430 may be the lubricant tank of the lubricant supply system 430 (e.g., lubricant tank 110 in FIG. 2, lubricant tank 210 in FIG. 3).

Figure 7:
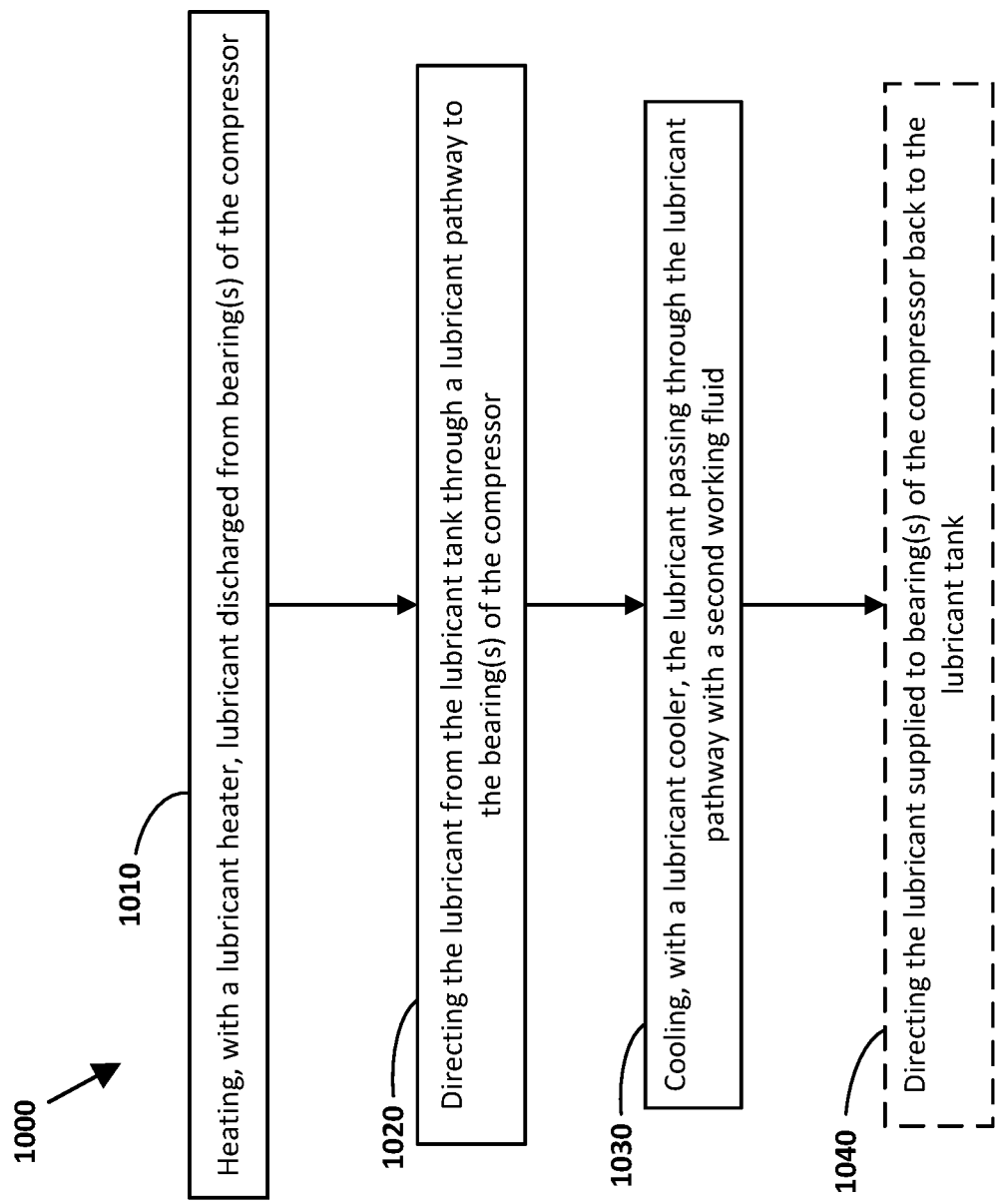
FIG. 7 is a block flow diagram for an embodiment of a method of lubricating a compressor.

FIG. 7 is a block flow diagram for a method 1000 of lubricating a compressor. In an embodiment, the method 1000 may be used for lubricating the compressor 10 in FIG. 1, the compressor 102 in FIG. 2, the compressor 102 in FIG. 3, and/or the compressor 400 in FIG. 6. The compressor is configured to compress a first working fluid. For example, the method 1000 may be utilized by the lubricant supply system 100 in FIG. 2 and/or the lubricant supply system 200 in FIG. 3. The method 1000 starts at 1010.

At 1010, a lubricant heater (e.g., lubricant heater 144, lubricant heater 244A, lubricant heater 370) heats lubricant discharged from the bearing(s) of the compressor (e.g., bearing(s) 104, bearing(s) 204) to increase a temperature (e.g., temperature $T_2$) of the lubricant in a lubricant tank (e.g., lubricant L in lubricant tank 110, lubricant L in lubricant tank 210). A lubricant refrigeration system (e.g., lubricant refrigeration system 140, lubricant refrigeration system 240) includes the lubricant heater and a lubricant cooler (e.g., lubricant cooler 148, lubricant cooler 248B). The heating at 1010 can include operating a refrigeration circuit of the lubricant refrigeration system (e.g., refrigeration circuit 150, refrigeration circuit 250A). The operating of the refrigeration circuit can include compressing a working fluid with an auxiliary compressor (e.g., auxiliary compressor 142, auxiliary compressor 242A), directing the compressed working fluid through the lubricant heater, expanding the working fluid with an expander (e.g., expander 146, expander 246A), and heating the expanded working fluid in an evaporator (e.g., evaporator 248A). The method 1000 then proceeds to 1020.

At 1020, the lubricant is directed from the lubricant tank to one or more bearings of the compressor through a lubricant pathway (e.g., lubricant pathway 120, lubricant pathway 220). Directing the lubricant through the lubricant pathway at 1020 can include passing the lubricant through the lubricant cooler. The method 1000 then proceeds to 1030.

At 1030, the lubricant cooler cools the lubricant passing through the pathway with a second working fluid. For example, the cooling at 1030 can include passing the at least one additional working fluid through the lubricant cooler physically separate from the lubricant. In an embodiment, the second working fluid can be a working fluid different from the first working fluid that is compressed by the compressor (e.g., the working fluid in the refrigerant circuit 150, the working fluid in the refrigerant circuit 250B). The second working fluid adsorbs heat from the lubricant in the lubricant cooler which cools the lubricant. In an embodiment, the cooling at 1030 may include operating a first refrigeration circuit (e.g., the refrigeration circuit 150, the refrigeration circuit 250B). Operating the first refrigeration circuit can include compressing second working fluid with an auxiliary compressor (e.g., auxiliary compressor 142, auxiliary compressor 242B), expanding the second working fluid with an expander (e.g., expander 146, expander 246B), and directing the second working fluid expanded by the expander through the lubricant cooler (e.g., lubricant cooler 148, lubricant cooler 248B). In another embodiment, the second working fluid may be the same working fluid as the working fluid compressed by the compressor. In an embodiment, the method 1000 may also include 1040.

At 1040, the lubricant supplied to the one or more bearings is directed back into the lubricant tank after flowing through the bearings. For example, the lubricant may be directed back to the lubricant tank at 1040 via gravity (e.g., when the lubricant tank is a sump of the compressor). For example, the lubricant may be directed back to the lubricant tank at 1040 by passing the working fluid discharged from the compressor through a lubricant separator (e.g., lubricant separator 103, lubricant separator 203), and then directing the separated lubricant from the lubricant separator back to the lubricant tank.

It should be appreciated that the method 1000 in an embodiment may be modified to have one or more features as described for the heat transfer circuit 1 in FIG. 1, the lubricant supply system 100 in FIG. 2, and/or the lubricant supply system 200 in FIG. 3.

ASPECTS

Any of Aspects 1-14 can be combined with any of Aspects 15-20.

Aspect 1. A lubricant supply system for a compressor in a heat transfer circuit, the compressor configured to compress a first working fluid including a refrigerant, the lubricant supply system comprising: a lubricant tank configured to contain lubricant discharged from one or more bearings of the compressor; a lubricant pathway connected to the lubricant tank and configured to supply the lubricant from the lubricant tank to the one or more bearings of the compressor; and a lubricant refrigeration system including a second working fluid including a refrigerant, a lubricant heater configured to heat the lubricant to increase a temperature of the lubricant in the lubricant tank, and a lubricant cooler configured to cool the lubricant flowing through the lubricant pathway with the second working fluid.

Aspect 2. The lubricant supply system of Aspect 1, wherein the lubricant supplied from the lubricant pathway to the one or more bearings of the compressor is less than saturated with the refrigerant.

Aspect 3. The lubricant supply system of any one of Aspects 1 and 2, wherein the lubricant refrigeration system is fluidly separate from the heat transfer circuit of the compressor and the second working fluid being different from the first working fluid.

Aspect 4. The lubricant supply system of Aspect 3, wherein the lubricant refrigeration system including an auxiliary compressor configured to compress the second working fluid and an expander configured to expand the second working fluid.

Aspect 5. The lubricant supply system of any one of Aspect 4, wherein the lubricant refrigeration system includes one or more refrigeration circuits separate from the heat transfer circuit, the one or more refrigeration circuits including the second working fluid, the lubricant heater, the lubricant cooler, the auxiliary compressor, and the expander.

Aspect 6. The lubricant supply system of Aspect 5, wherein the one or more refrigeration circuits include: a first refrigeration circuit including the second working fluid, the expander, the auxiliary compressor, and the lubricant heater that is a heat exchanger configured to heat the lubricant with the second working fluid, and a second refrigeration circuit including a third working fluid, a second auxiliary compressor, a second expander, and the lubricant cooler that is a heat exchanger configured to cool the lubricant flowing through the lubricant pathway with the third working fluid, the third working fluid including a refrigerant and being different from the first working fluid and the second working fluid.

Aspect 7. The lubricant supply system of Aspect 5, wherein the one or more refrigeration circuits includes a first refrigeration circuit including the second working fluid, the auxiliary compressor, the expander, the lubricant heater, and the lubricant cooler, the lubricant heater is a heat exchanger configured to heat the lubricant with the second working fluid, and the lubricant cooler is a heat exchanger configured to cool the lubricant flowing through the lubricant pathway with the second working fluid.

Aspect 8. The lubricant supply system of any one of Aspects 1-7, wherein the lubricant refrigeration system is configured to heat the lubricant passing through the lubricant heater and to cool the lubricant passing through the lubricant cooler simultaneously.

Aspect 9. The lubricant supply system of any one of Aspects 1-8, wherein the lubricant is discharged from the one or more bearings of the compressor at a first temperature, the lubricant heater is configured to increase the temperature of the lubricant to at or above a predetermined minimum temperature that is higher than the first temperature, and the lubricant cooler is configured to cool the lubricant to at or below a predetermined maximum temperature that is lower than the predetermined minimum temperature.

Aspect 10. The lubricant supply system of any one of Aspects 1-9, wherein the lubricant heater is disposed at the lubricant tank or between the compressor and the lubricant tank, and the lubricant pathway extends from the lubricant tank through the lubricant cooler.

Aspect 11. The lubricant supply system of any one of Aspects 1-9, wherein the lubricant heater is an electric heater.

Aspect 12. The lubricant supply system of any one of Aspects 1-9, further comprising: a lubricant separator including one or more inlets configured to receive a mixture of the lubricant and the refrigerant of the first working fluid discharged from the one or more bearings of the compressor, the lubricant heater configured to heat the lubricant within the lubricant separator, and a first outlet configured to discharge the lubricant after being heated by the lubricant heater to the lubricant tank.

Aspect 13. The lubricant supply system of Aspect 12, wherein the lubricant separator includes: a housing including the one or more inlets, the first outlet, and a second outlet, a flow director disposed within the housing and blocking a direct path from the inlet to the second outlet, the mixture of the lubricant and the refrigerant of the first working fluid including gaseous refrigerant, liquid lubricant, and gaseous refrigerant dissolved in the liquid lubricant, the flow director configured to direct: the gaseous refrigerant to flow around the flow director to the first outlet, the liquid lubricant through the lubricant heater to first outlet, the lubricant heater heating the liquid lubricant and liberating the gaseous refrigerant dissolved in the liquid lubricant from the liquid lubricant, and the gaseous refrigerant liberated from the liquid lubricant to the second outlet.

Aspect 14. The lubricant supply system of any one of Aspects 12 and 13, wherein the flow director has a tubular shape.

Aspect 15. A method of lubricating a compressor in a heat transfer circuit, the compressor configured to compress a first working fluid including a refrigerant, the method comprising: heating, with a lubricant heater of a lubricant refrigeration system, lubricant discharged from one or more bearings of the compressor to increase a temperature of the lubricant in a lubricant tank, a lubricant refrigeration system including, the lubricant heater, a lubricant cooler, and a second working fluid including a refrigerant; directing the lubricant from the lubricant tank through a lubricant pathway to one or more bearings of the compressor; and cooling, with the lubricant cooler of the lubricant refrigeration system, the lubricant passing through the lubricant pathway with the second working fluid.

Aspect 16. The method of Aspect 15, wherein the lubricant refrigeration system is fluidly separate from the heat transfer circuit of the compressor, the second working fluid being different from the first working fluid.

Aspect 17. The method of any one of Aspects 15 and 16, wherein the directing of the lubricant from the lubricant tank through the lubricant pathway to the one or more bearings of the compressor includes passing the lubricant through the lubricant cooler, and the cooling of the lubricant flowing through the lubricant pathway includes operating a first refrigerant circuit of the lubricant refrigeration system, the second refrigerant circuit including the second working fluid, an auxiliary compressor, an expander, and the lubricant cooler, the operating of the first refrigerant circuit including: compressing the working fluid with the auxiliary compressor, expanding the working fluid with the expander, and directing the second working fluid expanded by the expander through the lubricant cooler separate from the lubricant, and the second working fluid adsorbing heat from the lubricant passing through the lubricant cooler.

Aspect 18. The method of Aspect 17, wherein the heating of the lubricant with the lubricant heater includes the operating of the first refrigerant circuit of the lubricant refrigeration system, the operating of the first refrigerant circuit including: directing the second working fluid compressed by the auxiliary compressor to flow through the lubricant heater, and the lubricant adsorbing heat from the second working fluid flowing through the lubricant heater.

Aspect 19. The method of Aspect 17, wherein the heating of the lubricant with the lubricant heater includes operating a second refrigerant circuit of the lubricant refrigeration system, the second refrigerant circuit being separate from the first refrigerant circuit and including a second auxiliary compressor, the lubricant heater, a second expander, an evaporator, and a third working fluid that includes a refrigerant, the third working fluid different from the second working fluid, and the operating of the second refrigerant circuit including: compressing the third working fluid with the second auxiliary compressor, directing the third working fluid compressed by the second auxiliary compressor to flow through the lubricant heater, and the lubricant adsorbing heat from the third working fluid flowing through the lubricant heater, expanding the working fluid with the second expander, and heating the working fluid with the evaporator.

Aspect 20. The method of any one of Aspects 15-20, further comprising: directing the lubricant from the one or more bearings back to the lubricant tank.

The terminology used herein is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A lubricant supply system for a compressor in a heat transfer circuit, the compressor configured to compress a first working fluid including a refrigerant, the lubricant supply system comprising:
   a lubricant tank configured to contain lubricant discharged from one or more bearings of the compressor;
   a lubricant pathway connected to the lubricant tank and configured to supply the lubricant from the lubricant tank to the one or more bearings of the compressor; and
   a lubricant refrigeration system including a second working fluid including a refrigerant, a lubricant heater configured to heat the lubricant to increase a temperature of the lubricant in the lubricant tank to be at or above a predetermined minimum temperature, and a lubricant cooler configured to cool the lubricant flowing through the lubricant pathway with the second working fluid.

2. The lubricant supply system of claim 1, wherein the lubricant supplied from the lubricant pathway to the one or more bearings of the compressor is less than saturated with the refrigerant.

3. The lubricant supply system of claim 1, wherein the lubricant refrigeration system is fluidly separate from the heat transfer circuit of the compressor and the second working fluid being different from the first working fluid.

4. The lubricant supply system of claim 3, wherein the lubricant refrigeration system including an auxiliary compressor configured to compress the second working fluid and an expander configured to expand the second working fluid.

5. The lubricant supply system of claim 4, wherein the lubricant refrigeration system includes one or more refrigeration circuits separate from the heat transfer circuit, the one or more refrigeration circuits including the second working fluid, the lubricant heater, the lubricant cooler, the auxiliary compressor, and the expander.

6. The lubricant supply system of claim 5, wherein the one or more refrigeration circuits include:
   a first refrigeration circuit including the second working fluid, the expander, the auxiliary compressor, and the lubricant heater that is a heat exchanger configured to heat the lubricant with the second working fluid, and
   a second refrigeration circuit including a third working fluid, a second auxiliary compressor, a second expander, and the lubricant cooler that is a heat exchanger configured to cool the lubricant flowing through the lubricant pathway with the third working fluid, the third working fluid including a refrigerant and being different from the first working fluid and the second working fluid.

7. The lubricant supply system of claim 5, wherein the one or more refrigeration circuits includes a first refrigeration circuit including the second working fluid, the auxiliary compressor, the expander, the lubricant heater, and the lubricant cooler, the lubricant heater is a heat exchanger configured to heat the lubricant with the second working fluid, and the lubricant cooler is a heat exchanger configured to cool the lubricant flowing through the lubricant pathway with the second working fluid.

8. The lubricant supply system of claim 1, wherein the lubricant refrigeration system is configured to heat the lubricant passing through the lubricant heater and to cool the lubricant passing through the lubricant cooler simultaneously.

9. The lubricant supply system of claim 1, further comprising:
   a controller for the lubricant supply system, wherein
   the lubricant is discharged from the one or more bearings of the compressor at a first temperature, and
   the controller is configured to control the lubricant supply system such that:
      the lubricant heater increases the temperature of the lubricant to at or above the predetermined minimum temperature that is higher than the first temperature, and
      the lubricant cooler cools the lubricant to at or below a predetermined maximum temperature that is lower than the predetermined minimum temperature.

10. The lubricant supply system of claim 1, wherein
    the lubricant heater is disposed at the lubricant tank or between the compressor and the lubricant tank, and
    the lubricant pathway extends from the lubricant tank through the lubricant cooler.

11. The lubricant supply system of claim 1, wherein the lubricant heater is an electric heater.

12. The lubricant supply system of claim 1, further comprising:
    a controller for the lubricant supply system, the controller configured to control the lubricant supply system such that the lubricant heater heats the lubricant to increase the temperature of the lubricant in the lubricant tank to be at or above the predetermined minimum temperature, the predetermined minimum temperature corresponding to a dissolved refrigerant concentration of the lubricant of 40 wt % or less.

13. A lubricant supply system for a compressor in a heat transfer circuit, the compressor configured to compress a first working fluid including a refrigerant, the lubricant supply system comprising:
    a lubricant tank configured to contain lubricant discharged from one or more bearings of the compressor;
    a lubricant pathway connected to the lubricant tank and configured to supply the lubricant from the lubricant tank to the one or more bearings of the compressor;
    a lubricant refrigeration system including a second working fluid including a refrigerant, a lubricant heater configured to heat the lubricant to increase a temperature of the lubricant in the lubricant tank, and a lubricant cooler configured to cool the lubricant flowing through the lubricant pathway with the second working fluid, and
    a lubricant separator including:
       a housing including one or more inlets, a first outlet, and a second outlet, the one or more inlets configured to receive a mixture of the lubricant and the refrigerant of the first working fluid discharged from the one or more bearings of the compressor, the lubricant heater configured to heat the lubricant within the lubricant separator, and the first outlet configured to discharge the lubricant after being heated by the lubricant heater to the lubricant tank, a flow director disposed within the housing and blocking a direct path from the one or more inlets to the second outlet, the mixture of the lubricant and the refrigerant of the first working fluid including gaseous refrigerant, liquid lubricant, and gaseous refrigerant dissolved in the liquid lubricant, the flow director configured to direct:

the gaseous refrigerant to flow around the flow director to the first outlet, the liquid lubricant through the lubricant heater to the first outlet, the lubricant heater heating the liquid lubricant and liberating the gaseous refrigerant dissolved in the liquid lubricant from the liquid lubricant, and the gaseous refrigerant liberated from the liquid lubricant to the second outlet.

14. The lubricant supply system of claim 13, wherein the flow director has a tubular shape.

15. A method of lubricating a compressor in a heat transfer circuit, the compressor configured to compress a first working fluid including a refrigerant, the method comprising:

heating, with a lubricant heater of a lubricant refrigeration system, lubricant discharged from one or more bearings of the compressor to increase a temperature of the lubricant in a lubricant tank to be at or above a predetermined minimum temperature, the lubricant refrigeration system including, the lubricant heater, a lubricant cooler, and a second working fluid including a refrigerant;

directing the lubricant from the lubricant tank through a lubricant pathway to one or more bearings of the compressor; and cooling, with the lubricant cooler of the lubricant refrigeration system, the lubricant passing through the lubricant pathway with the second working fluid.

16. The method of claim 15, wherein the lubricant refrigeration system is fluidly separate from the heat transfer circuit of the compressor, the second working fluid being different from the first working fluid.

17. The method of claim 15, wherein the directing of the lubricant from the lubricant tank through the lubricant pathway to the one or more bearings of the compressor includes passing the lubricant through the lubricant cooler, and the cooling of the lubricant flowing through the lubricant pathway includes operating a first refrigeration circuit of the lubricant refrigeration system, the first refrigeration circuit including the second working fluid, an auxiliary compressor, an expander, and the lubricant cooler, the operating of the first refrigeration circuit including:

compressing the second working fluid with the auxiliary compressor, expanding the second working fluid with the expander, and directing the second working fluid expanded by the expander through the lubricant cooler separate from the lubricant, and the second working fluid absorbing heat from the lubricant passing through the lubricant cooler.

18. The method of claim 17, wherein the heating of the lubricant with the lubricant heater includes the operating of the first refrigeration circuit of the lubricant refrigeration system, the operating of the first refrigeration circuit including:

directing the second working fluid compressed by the auxiliary compressor to flow through the lubricant heater, and the lubricant absorbing heat from the second working fluid flowing through the lubricant heater.

19. The method of claim 17, wherein the heating of the lubricant with the lubricant heater includes operating a second refrigeration circuit of the lubricant refrigeration system, the second refrigeration circuit being separate from the first refrigeration circuit and including a second auxiliary compressor, the lubricant heater, a second expander, an evaporator, and a third working fluid that includes a refrigerant, the third working fluid different from the second working fluid, and the operating of the second refrigeration circuit including:

compressing the third working fluid with the second auxiliary compressor, directing the third working fluid compressed by the second auxiliary compressor to flow through the lubricant heater, and the lubricant absorbing heat from the third working fluid flowing through the lubricant heater, expanding the working fluid with the second expander, and heating the working fluid with the evaporator.

20. The method of claim 15, further comprising:

directing the lubricant from the one or more bearings back to the lubricant tank.

* * * * *